United States Patent [19]

Tanaka

[11] Patent Number: 4,482,218
[45] Date of Patent: Nov. 13, 1984

[54] ZOOM LENS

[75] Inventor: Kazuo Tanaka, Tokyo, Japan

[73] Assignee: Canon Kabushiki Kaisha, Tokyo, Japan

[21] Appl. No.: 320,093

[22] Filed: Nov. 10, 1981

[30] Foreign Application Priority Data

Nov. 11, 1980 [JP] Japan ............... 55-158504

[51] Int. Cl.³ .................... G02B 9/64; G02B 15/18
[52] U.S. Cl. ............................ 350/427; 350/439; 350/450
[58] Field of Search ................ 350/427, 439, 450

[56] References Cited

U.S. PATENT DOCUMENTS

| | | | |
|---|---|---|---|
| 2,971,051 | 2/1961 | Back | 350/173 |
| 3,125,626 | 3/1964 | Miles | 350/439 |
| 3,918,797 | 11/1975 | Takano | 350/450 |
| 4,017,161 | 4/1977 | Tsuji | 350/427 |
| 4,278,331 | 7/1981 | Tanaka | 350/427 |

Primary Examiner—John K. Corbin
Assistant Examiner—Rebecca D. Gass
Attorney, Agent, or Firm—Toren, McGeady and Stanger

[57] ABSTRACT

A zoom lens comprising, from front to rear, a front section having the focusing function, a zoom section having the magnification varying function, a diaphragm, and a relay section which is stationary during focusing and zooming. The relay section is constructed with four lenses, from front to rear, a positive first lens, negative second lens, positive third lens and positive fourth lens, and an exit pupil that lies at almost infinity from the focal plane.

2 Claims, 18 Drawing Figures

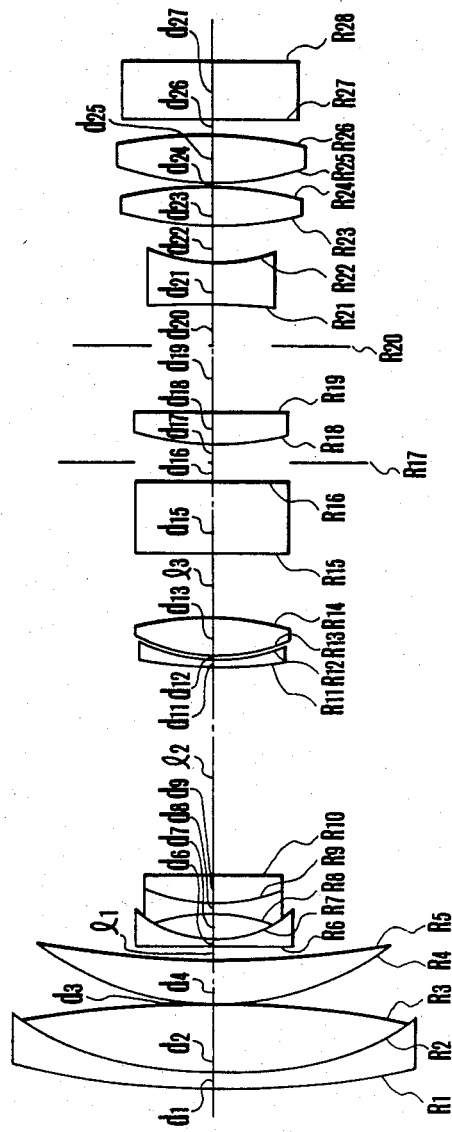
F I G. 5

ZOOM LENS

BACKGROUND OF THE INVENTION

This invention relates to a lens system having a stripe filter between the last lens surface and the focal plane, and more particularly to zoom lenses.

Excellent quality lens systems and particularly the zoom lenses for color television cameras must have excellent imaging characteristics and color reproductivity.

In case where as the color separation, use is made of a three-color separation prism between the last surface of the lens system and the focal plane. The difference of the angle of incidence of the light rays on the individual parts of the dielectric multi-layer coating provided for color separation breaks the uniformity of spectral characteristics and polarizing characteristics, causing color deviation between the central and marginal zones of the image pick-up surface. A proposal for the solution of this is given in Japanese Patent Sho 53-42370 or U.S. patent application Ser. No. 175,523, now U.S. Pat. No. 4,444,472.

In the two-tube or single tube type of system, where a stripe filter is used as the color separation system, the gap between the stripe filter and the image pick-up plane causes the phase in the image pick-up plane to differ with the distance from the center of the picture area to the margin thereof, which in turn causes color deviation. However, the use of the stripe filter is accepted in the type of lenses where the distance between the last lens surface and the focal plane is short as compared with the use of the color separation prism. Therefore, mere application of the conventional means does not suffice.

SUMMARY OF THE INVENTION

An object of the present invention is to provide a lens system particularly of the zoom type equipped with a stripe filter between the last lens surface and the focal plane. The system is excellent in imaging performance and in color reproductivity.

In the lens system, according to the present invention, the stripe filter is arranged between the last lens surface and the focal plane, and each principal ray of the beam emerging from the last surface of the lens system is almost parallel to the optical axis, so that all the principal rays are incident upon the stripe filter at almost the same angle, thus accomplishing the aforesaid object. In the present invention, an exit pupil of the lens system is formed at a position that may be regarded as almost infinity from the focal plane so that the principal rays of the individual beams emerging from the exit pupil of the entire lens system are made parallel.

In the lens system, according to the present invention, the lens components which are arranged on the image side of the diaphragm are, from front to rear, a positive first lens, a negative second lens, a positive third lens and a positive fourth lens to maintain excellent imaging characteristic and color reproductivity.

Furthermore in the lens system according to the present invention, it is preferred that the positive first lens has a convex front surface, the negative second lens is bi-concave, and the positive third and the positive fourth lenses are bi-convex.

BRIEF DESCRIPTION OF THE DRAWINGS

FIG. 5 is a longitudinal sectional view of a second embodiment of a zoom lens, according to the present invention.

DESCRIPTION OF THE PREFERRED EMBODIMENTS

Figure 1:
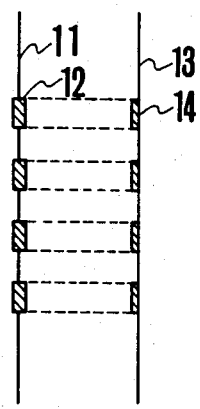
FIG. 1 is a schematic view illustrating the positional relationship of the stripe filter and a photo detector.

FIG. 1 illustrates the individual elements 12 of a stripe filter 11 which corresponds to the elements 14 of a photo detecting portion 13. As shown in FIG. 1, since all the elements 12 of the stripe filter 11 correspond in one-to-one relation with all the elements 14 of the photo detector, the emerging rays of light from the lens system have to be almost normal to the stripe filter 11 and photo detector 13. Otherwise a spurious signal will enter each photo detector element 14 and the correlation of the signals between the elements cannot be taken. This results in the running of colors on the image display. To solve this, we must have a system in which the angle of emergence of the principal ray from the lens system is constant independent of the image height. In other words, the exit pupil of the lens system lies substantially at infinity as in the telecentric system.

Figure 2:
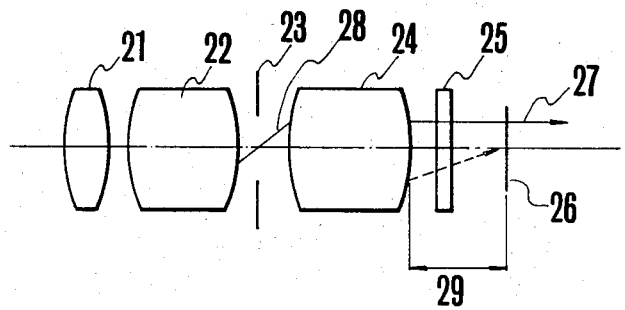
FIG. 2 is a schematic view illustrating the general configuration of the zoom lens of the present invention.

The position of the exit pupil of a lens system is determined by a lens section which is arranged on the image side of the diaphragm. The general configuration of the zoom lens comprises, from front to rear, a focus section having the focusing function, a zoom section having the image magnification varying function, a diaphragm and a fixed relay section. As illustrated in FIG. 2, the focus section 21, zoom section 22, and diaphragm 23 followed by the relay section 24 are required to satisfy the following three conditions:

(1) An image of the diaphragm is focused at infinity. That is, the position of an exit pupil is sufficiently distant as viewed from the focal plane.

(2) The distance from the rear vertex of the relay section to the focal plane (the so-called back focus) is sufficiently long for the provision of a stripe filter.

(3) Good correction is provided for the residual aberrations of the zoom section.

Condition (1) is that a ray of light passes through the diaphragm at the center thereof, or a so-called principal ray 28 after having emerged from the lens system, continues in parallel relationship with the optical axis, and arrives as a parallel ray 27 normal to the stripe filter 25. Condition (2) is that the back focus 29 is sufficient for providing the stripe filter 25 between the relay section 24 and the focal plane 26.

To achieve the conditions (1) and (2), the power distribution of the lens components constituting the relay section is required to be almost symmetric with respect to the center of the length thereof. That is, upon achievement of condition (1), a ray which passes the center of the diaphragm arranged very near the relay section will emerge from the relay section parallel with the optical axis. On the other hand, a light beam leaving the zoom section is incident through the diaphragm as an almost parallel beam on the relay section. This beam forms an image on the focal plane which is disposed near the relay section after only enough back focus to contain the stripe filter is indicated in connection with condition (2). This back focus is considerably shorter than when the prism type separation system is used, being no more than 20 mm. Thus, to satisfy conditions (1) and (2), the relay section must have an almost symmetric imaging action for the arriving ray from the diaphragm as an object point. The emerging ray is focused on the plane on the opposite side of the relay section to that in which the diaphragm lies. Furthermore, the relay section must have a positive power so that the image forming light beam emerging from the zoom section is focused on the focal plane.

Therefore, the fundamental configuration of the relay section includes, from front to rear, a positive first lens, a negative second lens and a positive third lens. In order to improve the imaging characteristics, or to facilitate correction of aberrations, however, according to the present invention, the last or third lens is divided into a positive third lens and a positive fourth lens.

In the preferred embodiments of the invention, regarding the achievement of proper correction of aberrations, the aforesaid positive first lens is convex toward the front, the negative second lens is bi-concave, and the positive third and the positive fourth lenses are bi-convex.

A large proportion of the 3rd order spherical aberration coefficient produced from the section on the front side of the diaphragm is ascribable to the focusing lens group or front section for a large positive sign and to the so-called variator in the zoom section for a large negative sign. However, it is impossible to cancel both the spherical aberrations perfectly, leaving some negative amount ascribable to the variator. Therefore, the relay section must be made to produce a positive value of spherical aberration. Since the relay section has a positive power, a positive value of third order spherical aberration is produced. In the present invention, the front surface of the positive first lens, both surfaces of the positive third lens and the rear surface of the positive fourth lens are configured to the aforesaid shapes. A third positive sign spherical aberration is actively produced which cancels out the residual one of the preceding section of the diaphragm. Thus, proper correction of image spherical aberration is achieved.

The coma affects the extra-axail imaging characteristics, as third order coma is produced by the front lens section of the diaphragm to a large positive value, the relay section must be made to produce the corresponding one of the negative value. In the present invention, a large negative value of third order coma is produced from the rear surface of the second or bi-concave lens to effect proper correction of the image coma.

When astigmatism affects the extra-axial imaging characteristics such as the coma, the front lens section of the diaphragm produces a positive value of third order astigmatism. In the present invention, both surfaces of the second or bi-concave lens in the relay section are made to produce a negative value of third order astigmatism, which cancels out the positive value of the one produced from the front lens section of the diaphragm.

Since, on the object side of the diaphragm, third order distortion changes its sign from positive to negative when zoomed from short focal length positions to long focal length positions, it is impossible, in principle, to compensate for that value by any design of the relay section as far as the zoom lens is concerned. Therefore, the production of distortion within the relay section must be minimized as much as possible. In the present invention, since the rear surface of the second negative lens produces a large negative value of distortion, a corresponding amount of positive distortion is produced from the front surface of the positive third lens and the front surface of the positive fourth lens. Thus, the relay section as a whole produces a very small value of distortion. Though the foregoing has been discussed in connection with the third order aberrations, exactly the same holds in the field of higher order aberrations.

Therefore, according to the aforesaid features of the invention, a zoom lens, which is excellent not only in the imaging characteristics but also in color reproducing characteristics, is realized.

Four examples of specific zoom lenses of the invention may be constructed in accordance with the numerical data given below for radius of curvature of the i−th surface, Ri, the axial thickness or axial air separation between the i−th and (i+1)th lens surfaces, di, the Abbe numbers, vd, and the refractive indices, nd. Furthermore, l1, l2, and l3 are variable axial air separations during zooming, and f is the focal length.

Figure 3:
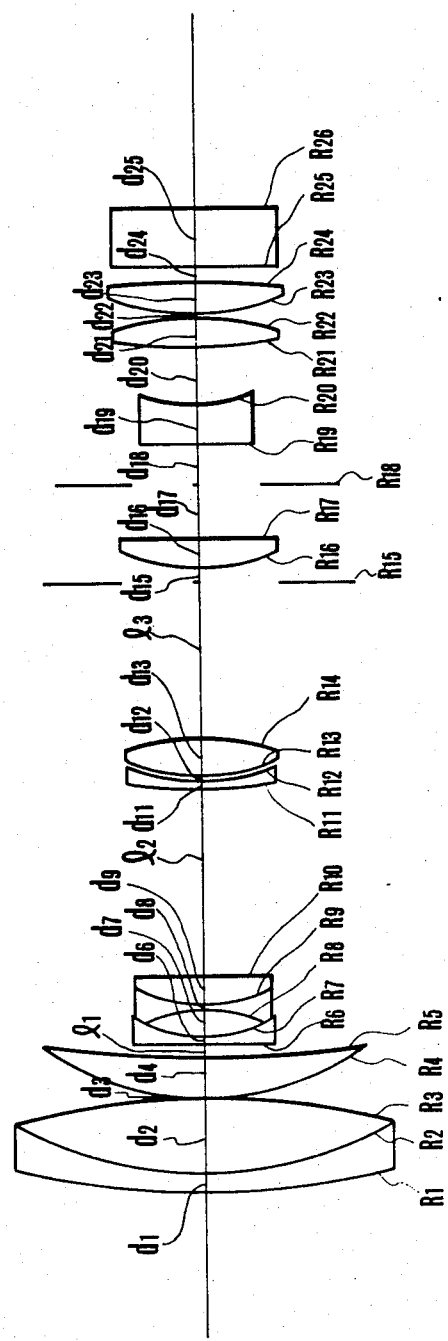
FIG. 3 is a longitudinal sectional view of a first embodiment of a zoom lens, according to the present invention.
Figure 4A:
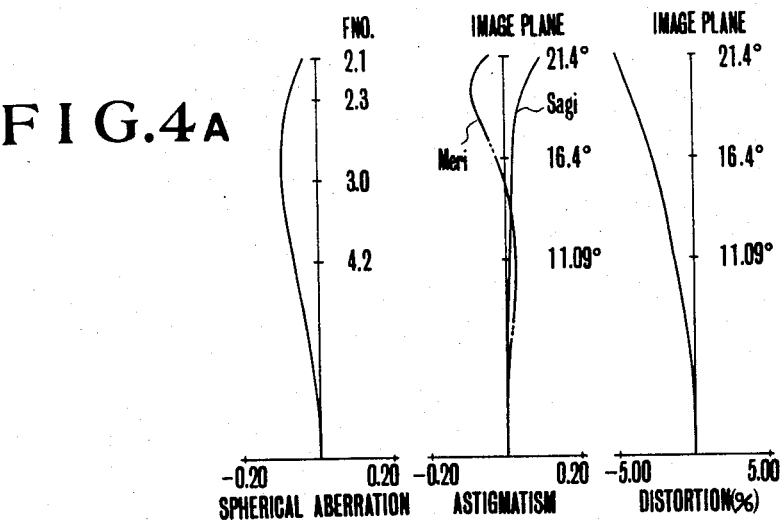
FIGS. 4A, 4B and 4C are graphic representations of the various aberrations of the zoom lens of FIG. 3 in different focal length positions.
Figure 4B:
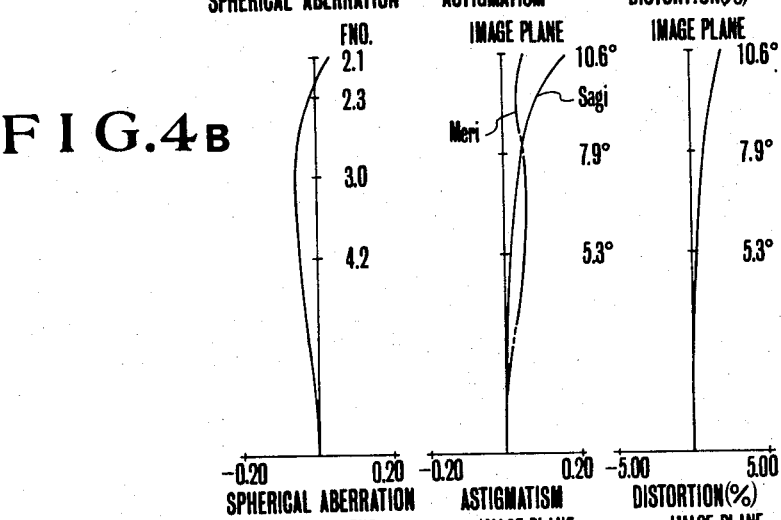
Figure 4C:
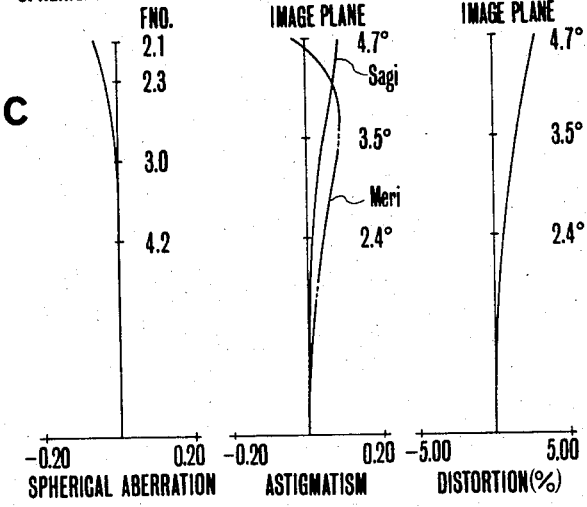
Figure 6A:
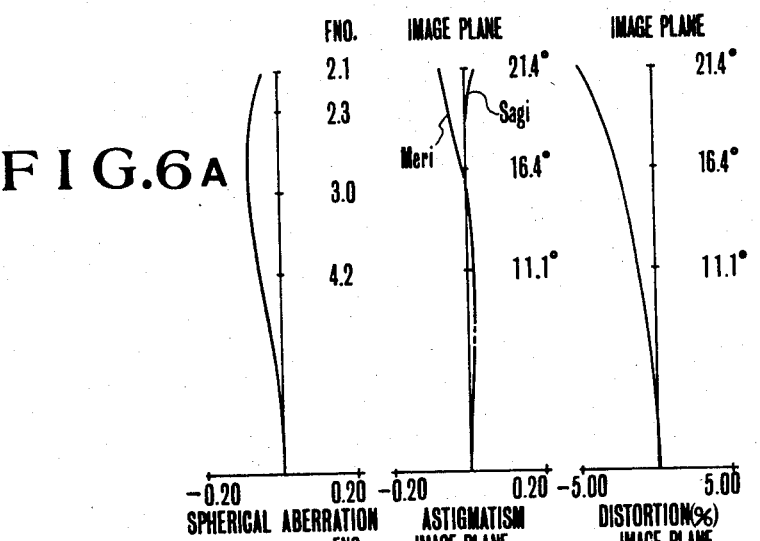
FIGS. 6A, 6B and 6C are graphic representations of the various aberrations of the lens of FIG. 5 in different focal length positions.
Figure 6B:
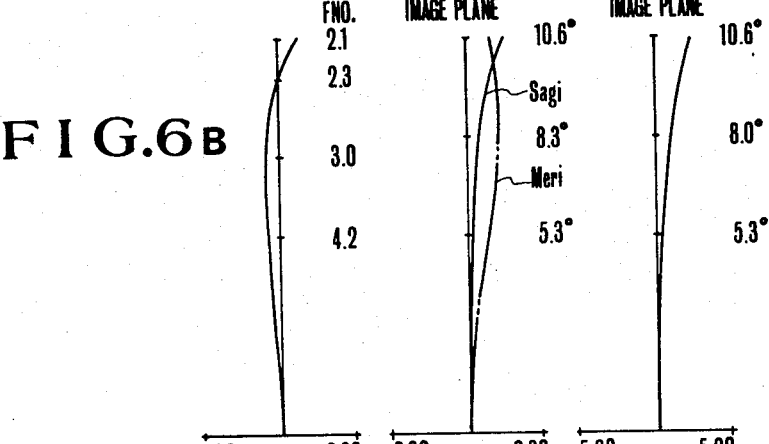
Figure 6C:
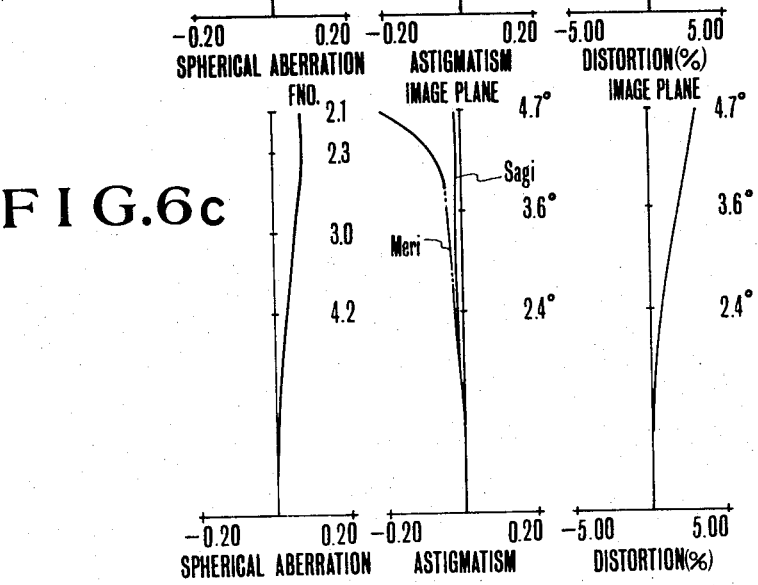
Figure 7:
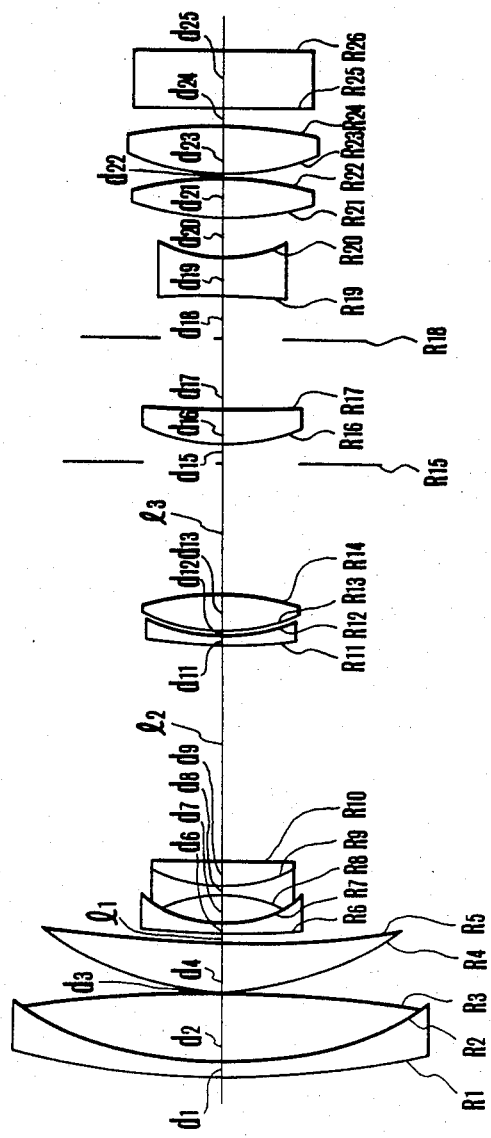
FIG. 7 is a longitudinal sectional view of a third embodiment of a zoom lens, according to the present invention.
Figure 8A:
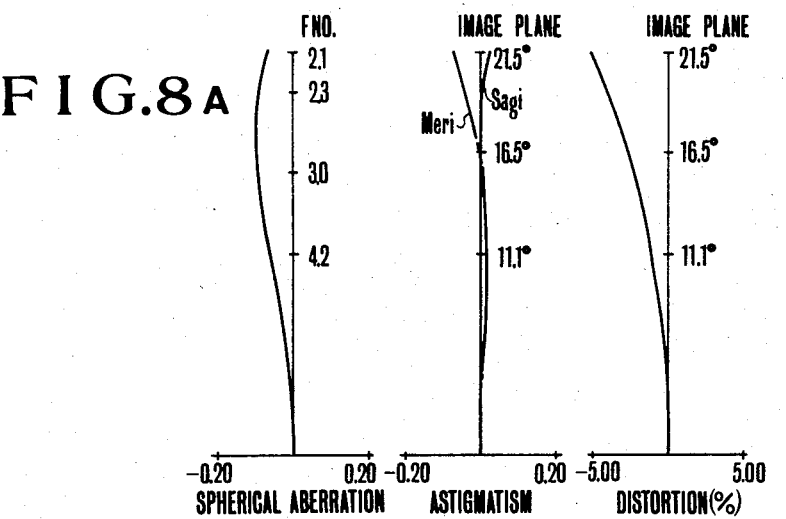
FIGS. 8A, 8B and 8C are graphic representations of the various aberrations of the lens of FIG. 7 in different focal length positions.
Figure 8B:
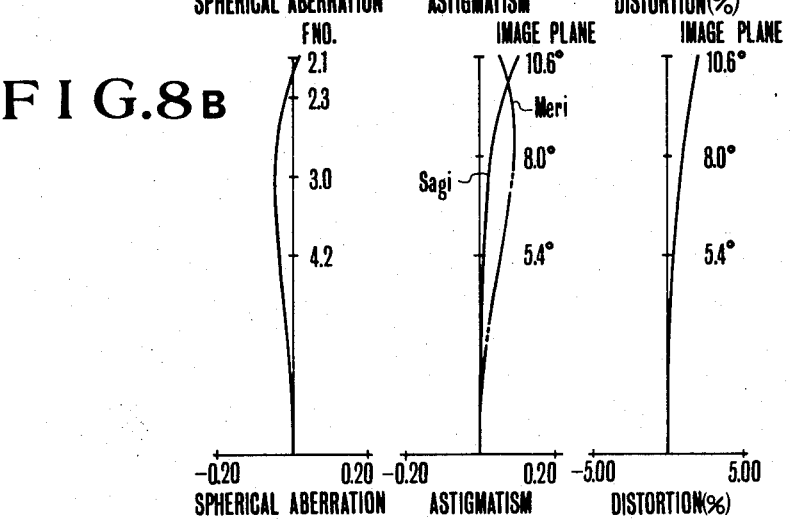
Figure 8C:
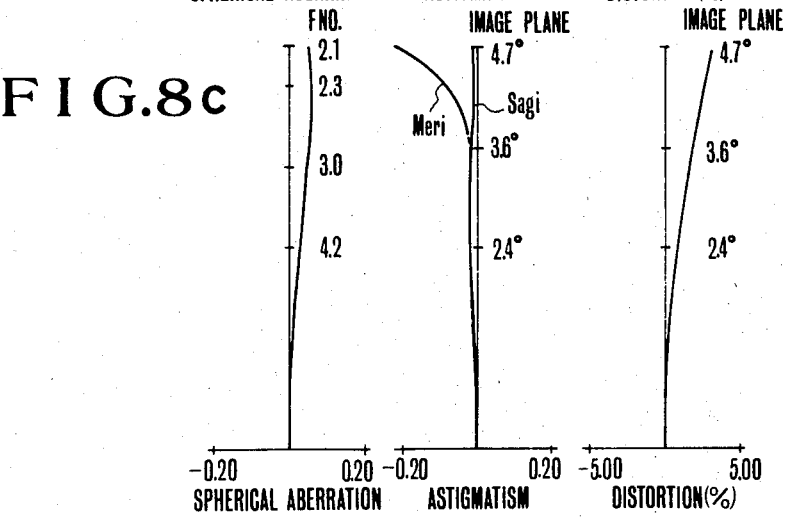
Figure 9:
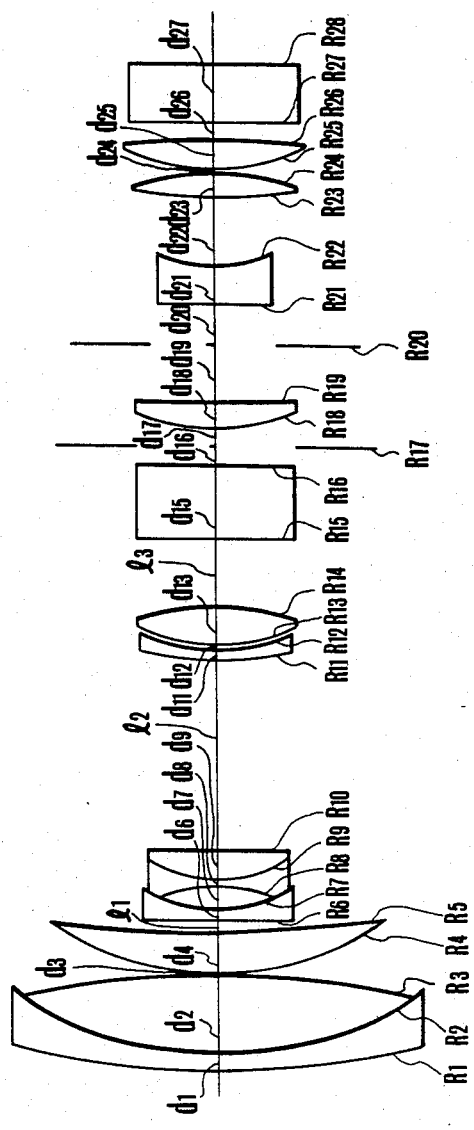
FIG. 9 is a longitudinal sectional view of a fourth embodiment of a zoom lens, according to the present invention.
Figure 10A:
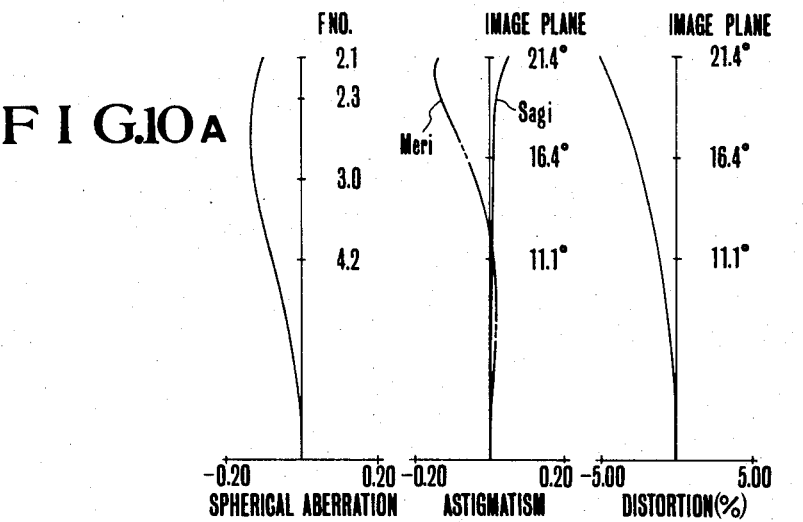
FIGS. 10A, 10B and 10C are graphic representations of the various aberrations of the lens of FIG. 8 in different focal length positions.
Figure 10B:
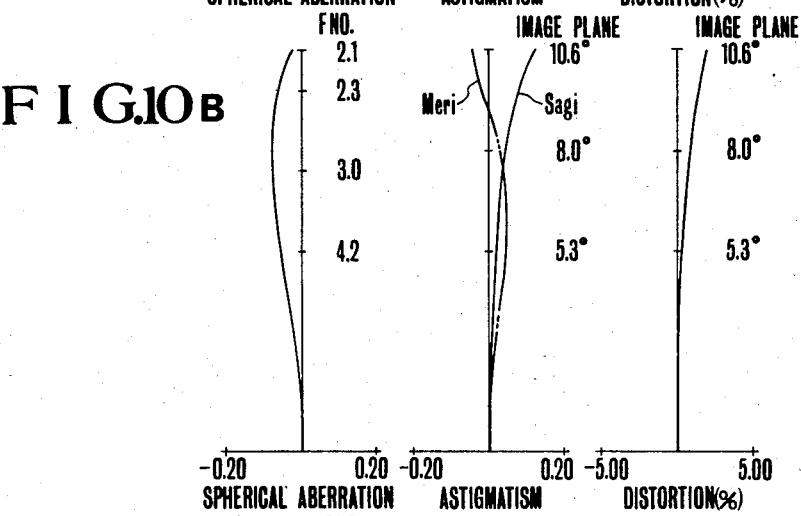
Figure 10C:
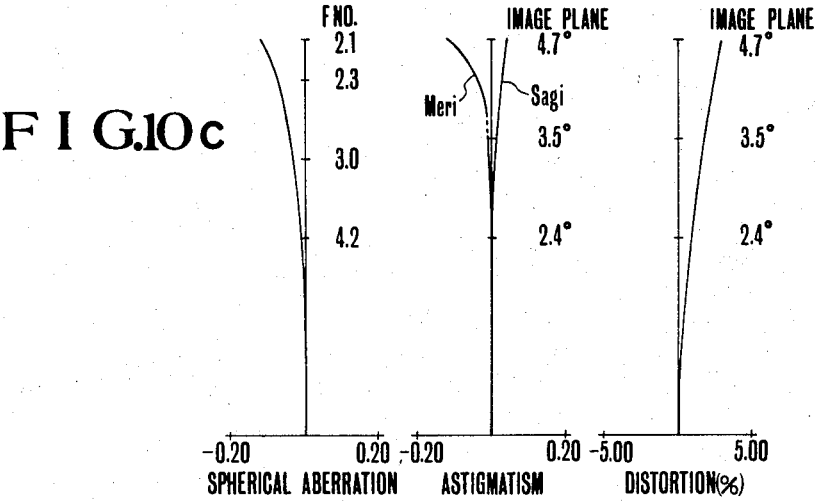

Furthermore, Example 1 of the zoom lens is illustrated in FIG. 3 and the various aberrations in three distinct positions for f=14.021, f=29.445 and f=66.601 in FIGS. 4A, 4B and 4C. Example 2 of the lens is illustrated in FIG. 5 along with its various aberrations in the three distinct positions for f=14.001, f=29.403 and f=66.506 in FIGS. 6A, 6B and 6C. Example 3 of the lens is illustrated in FIG. 7 along with its various aberrations in the three distinct positions for f=13.960, f=29.315 and f=66.307 in FIGS. 8A, 8B and 8C. Example 4 of the lens is illustrated in FIG. 9 along with its various aberrations in the three distinct positions for f=14.036, f=29.476 and f=66.672 in FIGS. 10A, 10B and 10C.

Also R15 and R16 in Examples 2 and 4 define a prism for splitting off a beam to the finder, and R25, R26 in Example 1, R27, R28 in Example 2, R25, R26 in Example 3, and R27, R28 in Example 4 each define a stripe filter.

Example 1

| Surface No. | R | d | vd | nd |
| --- | --- | --- | --- | --- |
| 1 | 84.146 | 2.00 | 25.4 | 1.80518 |
| 2 | 35.583 | 7.87 | 61.0 | 1.58913 |
| 3 | −103.996 | 0.10 | | 1. |
| 4 | 27.917 | 4.07 | 61.0 | 1.58913 |

Example 1-continued

| | | | | |
|---|---|---|---|---|
| 5 | 95.165 | $l_1$ | | 1. |
| 6 | 363.049 | 0.90 | 53.2 | 1.69350 |
| 7 | 12.195 | 2.61 | | 1. |
| 8 | −16.671 | 0.90 | 53.2 | 1.69350 |
| 9 | 13.785 | 2.79 | 25.4 | 1.80518 |
| 10 | −7680.848 | $l_2$ | | 1. |
| 11 | 39.088 | 0.90 | 33.8 | 1.64769 |
| 12 | 17.070 | 0.54 | | 1. |
| 13 | 18.367 | 3.78 | 64.1 | 1.51633 |
| 14 | −30.864 | $l_3$ | | 1. |
| 15 | 0.0 | 1.68 | | 1. |
| 16 | 19.776 | 2.67 | 47.2 | 1.54072 |
| 17 | 182.914 | 6.00 | | 1. |
| 18 | 0.0 | 4.25 | | 1. |
| 19 | −112.675 | 4.20 | 23.9 | 1.84666 |
| 20 | 15.741 | 6.04 | | 1. |
| 21 | 50.297 | 3.00 | 60.7 | 1.60311 |
| 22 | −30.735 | 0.50 | | 1. |
| 23 | 22.374 | 3.51 | 61.2 | 1.55963 |
| 24 | −77.846 | 2.00 | | 1. |
| 25 | 0.0 | 6.00 | 64.1 | 1.51633 |
| 26 | 0.0 | | | 1. |

| | f = 14.021 | f = 29.445 | f = 66.601 |
|---|---|---|---|
| $l_1$ | 1.4950 | 13.8309 | 20.0881 |
| $l_2$ | 19.9510 | 14.5023 | 1.3743 |
| $l_3$ | 16.7980 | 9.9108 | 16.7816 |

The exit pupil at a distance of 568.5 m as measured forwardly from the focal plane.
Back Focus: 15.895 mm
R15: Diaphragm;
R18: Fixed Diaphragm

Example 2

| Surface No. | R | d | νd | nd |
|---|---|---|---|---|
| 1 | 95.272 | 1.40 | 25.4 | 1.80518 |
| 2 | 39.047 | 7.32 | 61.0 | 1.58913 |
| 3 | −114.420 | 0.15 | | 1. |
| 4 | 30.544 | 4.58 | 61.0 | 1.58913 |
| 5 | 106.731 | $l_1$ | | 1. |
| 6 | 149.915 | 0.90 | 61.0 | 1.58913 |
| 7 | 12.095 | 2.86 | | 1. |
| 8 | −17.698 | 0.90 | 53.2 | 1.69350 |
| 9 | 14.436 | 2.87 | 25.4 | 1.80518 |
| 10 | 288.052 | $l_2$ | | 1. |
| 11 | 52.498 | 1.00 | 33.8 | 1.64769 |
| 12 | 18.896 | 0.47 | | 1. |
| 13 | 20.251 | 3.61 | 59.5 | 1.53996 |
| 14 | −32.430 | $l_3$ | | 1. |
| 15 | 0.0 | 7.50 | 64.1 | 1.51633 |
| 16 | 0.0 | 2.00 | | 1. |
| 17 | 0.0 | 1.68 | | 1. |
| 18 | 21.818 | 3.45 | 60.3 | 1.62041 |
| 19 | 116.330 | 7.37 | | 1. |
| 20 | 0.0 | 4.25 | | 1. |
| 21 | −86.174 | 4.20 | 25.4 | 1.80518 |
| 22 | 15.402 | 3.88 | | 1. |
| 23 | 30.872 | 4.03 | 60.7 | 1.60311 |
| 24 | −34.423 | 0.50 | | 1. |
| 25 | 26.715 | 4.88 | 53.0 | 1.57135 |
| 26 | −46.357 | 2.00 | | 1. |
| 27 | 0.0 | 6.00 | 64.1 | 1.51633 |
| 28 | 0.0 | | | 1. |

| | f = 14.001 | f = 29.403 | f = 66.506 |
|---|---|---|---|
| $l_1$ | 1.1870 | 14.8922 | 21.8441 |
| $l_2$ | 22.2770 | 16.2240 | 1.6398 |
| $l_3$ | 7.2950 | −0.3572 | 7.2751 |

The exit pupil at a distance of 92.5 m as measured forwardly from the focal plane.
Back Focus: 13.019 mm;
R17: Diaphragm;
R20: Fixed Diaphragm

Example 3

| Surface No. | R | d | νd | nd |
|---|---|---|---|---|
| 1 | 95.272 | 1.40 | 25.4 | 1.80518 |
| 2 | 39.047 | 7.32 | 61.0 | 1.58913 |
| 3 | −114.420 | 0.15 | | 1. |
| 4 | 30.544 | 4.58 | 61.0 | 1.58913 |

Example 3-continued

| | | | | |
|---|---|---|---|---|
| 5 | 106.731 | $l_1$ | | 1. |
| 6 | 149.915 | 0.90 | 61.0 | 1.58913 |
| 7 | 12.095 | 2.86 | | 1. |
| 8 | −17.698 | 0.90 | 53.2 | 1.69350 |
| 9 | 14.436 | 2.87 | 25.4 | 1.80518 |
| 10 | 288.052 | $l_2$ | | 1. |
| 11 | 52.498 | 1.00 | 33.8 | 1.64769 |
| 12 | 18.896 | 0.47 | | 1. |
| 13 | 20.251 | 3.61 | 59.5 | 1.53996 |
| 14 | −32.430 | $l_3$ | | 1. |
| 15 | 0.0 | 1.68 | | 1. |
| 16 | 21.772 | 3.45 | 60.3 | 1.62041 |
| 17 | 129.827 | 7.37 | | 1. |
| 18 | 0.0 | 4.25 | | 1. |
| 19 | −125.019 | 4.20 | 25.4 | 1.80518 |
| 20 | 14.537 | 3.88 | | 1. |
| 21 | 29.045 | 4.03 | 60.7 | 1.60311 |
| 22 | −39.873 | 0.50 | | 1. |
| 23 | 25.769 | 4.88 | 53.0 | 1.57135 |
| 24 | −43.219 | 2.00 | | 1. |
| 25 | 0.0 | 6.00 | 64.1 | 1.51633 |
| 26 | 0.0 | | | 1. |

| | f = 13.960 | f = 29.315 | f = 66.307 |
|---|---|---|---|
| $l_1$ | 1.1870 | 14.8922 | 21.8441 |
| $l_2$ | 22.2770 | 16.2240 | 1.6398 |
| $l_3$ | 14.1640 | 6.5118 | 14.1441 |

The exit pupil at a distance of 59.9 m as measured forwardly from the focal plane.
Back Focus: 12.285 mm;
R15: Diaphragm;
R18: Fixed Diaphragm

Example 4

| Surface No. | R | d | νd | nd |
|---|---|---|---|---|
| 1 | 84.146 | 2.00 | 25.4 | 1.80518 |
| 2 | 35.583 | 7.87 | 61.0 | 1.58913 |
| 3 | −103.996 | 0.10 | | 1. |
| 4 | 27.917 | 4.07 | 61.0 | 1.58913 |
| 5 | 95.165 | $l_1$ | | 1. |
| 6 | 363.049 | 0.90 | 53.2 | 1.69350 |
| 7 | 12.195 | 2.61 | | 1. |
| 8 | −16.671 | 0.90 | 53.2 | 1.69350 |
| 9 | 13.785 | 2.79 | 25.4 | 1.80518 |
| 10 | −7680.848 | $l_2$ | | 1. |
| 11 | 39.088 | 0.90 | 33.8 | 1.64769 |
| 12 | 17.070 | 0.54 | | 1. |
| 13 | 18.367 | 3.78 | 64.1 | 1.51633 |
| 14 | −30.864 | $l_3$ | | 1. |
| 15 | 0.0 | 7.50 | 64.1 | 1.51633 |
| 16 | 0.0 | 2.00 | | 1. |
| 17 | 0.0 | 1.68 | | 1. |
| 18 | 20.310 | 2.44 | 60.3 | 1.62041 |
| 19 | 114.173 | 6.00 | | 1. |
| 20 | 0.0 | 4.22 | | 1. |
| 21 | −127.783 | 4.20 | 23.9 | 1.84666 |
| 22 | 16.023 | 6.76 | | 1. |
| 23 | 58.319 | 2.41 | 60.7 | 1.60311 |
| 24 | −30.084 | 0.50 | | 1. |
| 25 | 21.765 | 2.73 | 61.2 | 1.55963 |
| 26 | −99.914 | 2.00 | | 1. |
| 27 | 0.0 | 6.00 | 64.1 | 1.51633 |
| 28 | 0.0 | | | 1. |

| | f = 14.036 | f = 29.476 | f = 66.672 |
|---|---|---|---|
| $l_1$ | 1.4950 | 13.8309 | 20.0881 |
| $l_2$ | 19.9510 | 14.5023 | 1.3743 |
| $l_3$ | 7.2980 | 0.4108 | 7.2816 |

The exit pupil at a distance of 83.7 m as measured forwardly from the focal plane.
Back Focus: 15.619 mm;
R17: Diaphragm;
R20: Fixed Diaphragm

What is claimed is:
1. A zoom lens system comprising, from front to rear:
a focusing lens group having the focusing function;
a zooming lens group having the image magnification varying function;

a diaphragm for limiting a light beam from said zooming lens group;

a relay lens group stationary during focusing and zooming and forming an image of said diaphragm at an almost infinite distance position from an image plane of said lens system, said relay lens group comprising, from front to rear, a positive first lens, a negative second lens, a positive third lens and a positive fourth lens; and a stripe filter disposed between said relay lens group and the image plane, said diaphragm and relay lens group further being arranged to cause the principal rays of the light beam emerging from said relay lens group to enter said stripe filter in parallel.

2. A zoom lens as described in claim 1, wherein said positive first lens is a positive lens of convex curvature toward the front, said negative second lens is a bi-concave lens, and said positive third and said positive fourth lenses are bi-convex lenses.

* * * * *